Aug. 11, 1964   A. L. SIMMONS ETAL   3,143,889
ANGULAR VELOCITY MEASURING DEVICE
Filed Aug. 23, 1960

WITNESSES:
Bernard R. Gieguey
James F. Young

INVENTORS
Arthur L. Simmons, David W. Roese,
and John W. Dzimianski.
BY
PATENT AGENT

United States Patent Office 3,143,889
Patented Aug. 11, 1964

3,143,889
ANGULAR VELOCITY MEASURING DEVICE
Arthur L. Simmons, Baltimore, and David W. Roese and John W. Dzimianski, Catonsville, Md., assignors to Westinghouse Electric Corporation, East Pittsburgh, Pa., a corporation of Pennsylvania
Filed Aug. 23, 1960, Ser. No. 51,328
7 Claims. (Cl. 73—505)

This invention relates to devices for measuring rates of turning, i.e., angular velocity, and more particularly to such devices referred to as vibratory gyros.

Vibratory gyros as heretofore proposed and employed include a base, carrying output guiding constraint means and driving constraint means cooperative with a mass means to permit normally rectilinear vibratory movement of such mass means while affording freedom for transverse vibratory movement responsively to turning movement of the base about an axis perpendicular to the direction of such vibratory movement, or substantially so together with driving means for effecting such rectilinear vibratory movement and output signal means responsive to the transverse vibratory movement to indicate the rate of the aforesaid turning movement of the base. Suitably mounted on a vehicle, the output signal is representative of the rate of turning of such vehicle about a selected axis and the phase of such output signal relative to a reference signal is indicative of the direction of such turning.

Vibratory gyro devices heretofore proposed have been somewhat complex and space-demanding due primarily to the number and character of the components employed.

In view of the foregoing remarks, it becomes a prime object of the present invention to provide a vibratory gyro device possessing a greater simplicity of construction than heretofore proposed, thereby affording, in addition to reduction in size and weight of such a device, an increase in reliability of its operation.

It is another object of the present invention to provide a vibratory gyro device embodying a simplicity of construction whereby a single element performs the functions of all of the previously-identified means, i.e., the mass means, the output guiding and driving constraint means, the driving means, and the output signal means.

It becomes still another object of the present invention to provide a vibratory gyro device in accord with the preceding objects, which has low power requirements and may be manufactured at relatively low cost.

Figure 1:
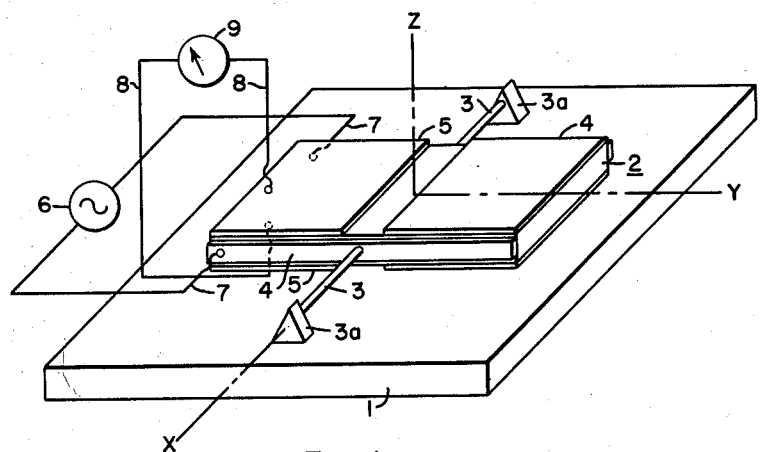
Figure 2:
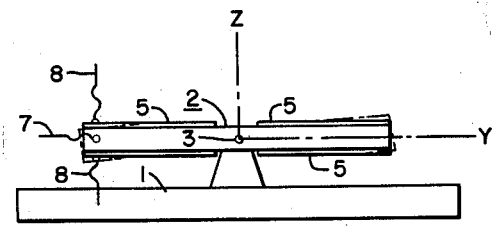

Other objects and advantages of the invention will become apparent from the following description of such invention taken in conjunction with the accompanying drawing in which:

FIGURE 1 is a diagrammatic representation, in perspective, of the novel vibratory gyro device embodying the invention; and FIG. 2 is a side elevation view partly in outline and, partly in section, of the device of FIG. 1 illustrating, with exaggeration, mechanical response of such device to a rotary input motion.

Referring now to FIG. 1, the novel vibratory gyro device employs a base 1 which may be any desired shape, but for the sake of illustration may be a simple plate-like member as shown in the drawing. The body 1 is adapted to be mounted on a vehicle or craft which may employ this device for sensing rate of turning movement of such craft with respect to a selected axis. In accord with a prime feature of this invention, a single piezoelectric element 2 is supported by the base 1 through the medium of a mounting member 3 preferably in the form of a rod-like element extending through element 2 along the x-axis and supported at opposite ends by elements 3a attached to the body 1.

The piezoelectric element 2 is preferably, although not necessarily, in the form of a rectangular parallelepiped or plate extending generally parallel to the plate-like body 1 and in opposite directions from the member 3 which is located substantially equidistant from opposite ends of element 2. Piezoelectric element 2 may be of crystalline material, such as quartz, or ceramic material, such as barium titanate. Depending on the material and the orientation with respect to the crystallographic axes, the element 2 in form of a single plate cut from a piezoelectric crystal can exhibit transverse expansion, thickness expansion, thickness shear, and face shear. It is essential that such element 2 exhibit a combination of two or more modes of deformation, although not necessarily of equal magnitude. For ceramic materials, the directions of the electrical and mechanical axes depend upon the direction of the original polarizing field which is controlled in manufacture.

In accord with the present invention the piezoelectric element 2, either crystalline or ceramic, is preferably constructed and arranged such that the electric field will be along the x-axis, as viewed in FIG. 1, and the translational vibration will be along the y-axis. Electrodes 4 in the form of plated surfaces, for example, for the excitation voltage to be applied to the element 2 will be attached to the faces of such element perpendicular to the x-axis, while electrodes 5 for the output signal perferably are attached to the surfaces perpendicular to the z-axis. Location of the electrodes 4 and 5 for excitation and output, respectively, will be in accord with the piezoelectric material used and the reference axes involved.

In operation of the illustrated device, excitation of the piezoelectric element 2 from an alternating current voltage source 6 via leads 7 connected to electrodes 4 will cause translational vibration of such element 2 along the y-axis, with the portions of such element at opposite sides of the member 3 acting as a pair of oppositely-arranged masses vibrating 180° out of phase, so that the translational forces will be in balance. During turning movement of the base 1 about the x-axis a flexural vibratory motion of piezoelectric element 2 at the same frequency as that of the translational vibration will result along the y-axis and about the x-axis, as indicated in FIG. 2 Such flexural vibratory motion results in an amplitude modulated signal output from electrodes 5 which is fed via leads 8 to such as a meter 9, for example, as a means for indicating magnitude of such signal, which signal is proportional to the magnitude of the rate of such rotary movement of the base 1 about the x-axis and the phase of which relative to a reference, such as the driving signal from source 6 is respective to the direction of such turning movement. It will be noted that member 3 is located along the x-axis so as to coincide with respect to a nodal point common to both the translational and flexural modes of vibration to prevent the support from having undesired restraint on such element to such vibration.

For optimum performance, a high mechanical Q is desirable for the translational vibration of the piezoelectric element 2, since less energy is required to derive a given translational response. For the flexural vibration, or output mode, a lower mechanical Q is desirable to prevent ringing and to reduce the time constant of the instrument as a gyro device. The reduction of the flexural Q can be obtained, for example, by properly plating the surfaces perpendicular to the z-axis, and such plating may also serve as the output electrodes 5 for the device. It is preferable that dissipation of energy for flexural motion be greater than that for translational motion.

Another method of obtaining a low flexural Q is by using two or more crystals or ceramic plates in a laminated construction.

A phase difference of 90° between the output signal and the excitation voltage exists when the translational resonant frequency equals the flexural resonant frequency. This phase difference tends to prevent the masking of the output signal by the excitation voltage and thus facilitates the extraction of the rate intelligence from the piezoelectric element 2.

It will be apparent also that a vibro gyro constructed in accord with the present invention also enables the element 2 to function as a feed-back source in a crystal oscillator in a well-known manner to stabilize the frequency of vibration of such element.

While the invention has been described with a certain degree of particularity, it will be apparent to those skilled in the art that minor modifications thereof may be made without departing from the spirit and the scope of the invention as defined by the following claims.

We claim as our invention:

1. A vibratory gyro device comprising a piezoelectric element of symmetrical plate-like form having an axis of symmetry extending widthwise transversely therethrough equidistant opposite ends, electrodes located on longitudinal side edges of said element to effect rectilinear vibration thereof at opposite sides of said axis 180° out of phase, said element being responsive to turning about said axis to vibrate also in a flexural mode thereabout, electrode means on said element for extracting an output signal therefrom resultant from said flexural mode of vibration, and means for applying an input turning effort to said element substantially in coincidence with said axis.

2. A vibratory gyro device comprising a piezoelectric element, excitation electrode means on said element, said element and said excitation electrode means being constructed and arranged for causing vibration of said element as a pair of self-driven vibratory masses 180° out of phase at opposite sides of a selected axis and to produce an electrical turn-rate signal in a second vibratory mode responsively to turning about said axis, and output electrode means on said element for extracting said turn-rate signal.

3. A vibratory gyro device comprising an elongated piezoelectric element, excitation electrode means on said element, said element and said excitation electrode means being constructed and arranged to effect vibration of said element longitudinally at opposite sides of a transverse axis equidistant opposite ends 180° out of phase and to cause said element while thus vibrating and subjected to turning movement about said axis to vibrate also in a flexural mode for producing an electrical output signal, electrode means on said element for extracting said output signal from said element, and means supporting said element along said axis and adapting said element for mounting on a vehicle.

4. A vibratory gyro device comprising a piezoelectric element, excitation electrode means on said element, said element and said excitation electrode means being constructed and arranged to effect vibration of said element in a first mode at opposite sides of an axis of symmetry and while thus vibrating to vibrate also in a second mode producing an electrical output signal responsively to turning movement about said axis, electrode means on said element for extracting said output signal, and means for mounting said element along said axis to effect said turning movement in accord with a corresponding spatial axis about which rate-of-turning information is desired.

5. A vibratory gyro device comprising a piezoelectric element, excitation electrode means on said element, said element and said excitation electrode means being constructed and arranged to effect vibration of said element in a translational mode at opposite sides of an axis located at a nodal point of such translational vibration and to simultaneously vibrate in a second mode for producing an electrical output signal responsively to turning movement about said axis, said axis also being located at a nodal point of vibration of said second mode, and signal output electrode means on said element.

6. A vibratory gyro device comprising a piezoelectric element, excitation electrode means on said element, said element and excitation electrode means being constructed and arranged for vibrating said element as a pair of oppositely-arranged self-driven masses vibrating 180° out of phase and responsive to turning about a selected axis to vibrate simultaneously also in a second mode for producing an electrical output signal which is amplitude modulated according to the rate of such turning, means for energizing said excitation electrode means, and electrode means on said element for extracting said output signal.

7. In a vibratory gyro device, a symmetrical element of uniform cross-sectional mass distribution and of a material exhibiting an internal vibratory strain reaction to an alternating electrical excitation and exhibiting an alternating electrical characteristic responsively to an alternating strain, said element being constructed and arranged for internal vibration in a driven mode normal to and in opposed relationship at opposite sides of an axis of symmetry of said element and for internal vibration in an output mode in opposed relationship at opposite sides of said axis of symmetry responsively to being turned about said axis while vibrating in said driven mode, said output mode being a vibratory mode different than said driven mode, a mounting member supporting said element in a nodal region of vibration in both input and output modes, and means for introducing said electrical excitation to vibrate said element in its driven mode and for sensing of said electrical characteristic as exhibited responsively to strain produced by vibration in said output mode, without disturbance to the uniform cross-sectional mass distribution of said element as supported by said mounting member.

References Cited in the file of this patent

UNITED STATES PATENTS

| | | |
|---|---|---|
| 2,544,646 | Barnaby | Mar. 13, 1951 |
| 2,627,400 | Lyman | Feb. 3, 1953 |
| 2,683,247 | Wiley | July 6, 1954 |
| 2,974,530 | Jaouen | Mar. 14, 1961 |